United States Patent [19]

Morisseau

[11] 3,965,935

[45] June 29, 1976

[54] MIXER TAP

[76] Inventor: Bernard Jean Harry Morisseau, 22, Avenue de Friedland, 75 Paris, France

[22] Filed: Nov. 20, 1973

[21] Appl. No.: 417,526

[30] Foreign Application Priority Data

Nov. 29, 1972 France .............................. 72.42368

[52] U.S. Cl. ......................... 137/625.4; 137/625.42
[51] Int. Cl.² .......................................... F16K 11/06
[58] Field of Search ................. 137/625.17, 625.14, 137/625.42, 625.43, 636.2, 636, 625.13, 625.17; 251/236, 174

[56] References Cited
UNITED STATES PATENTS

| | | | |
|---|---|---|---|
| 1,790,168 | 1/1931 | Paul | 137/625.43 X |
| 2,020,286 | 11/1935 | Bittle | 137/625.13 |
| 2,377,473 | 6/1945 | Wolcott | 251/174 X |
| 2,448,649 | 9/1948 | Adams et al. | 137/625.2 |
| 2,503,881 | 4/1950 | Manis | 137/625.42 X |
| 2,601,966 | 7/1952 | Busick | 137/625.42 X |
| 3,433,264 | 3/1969 | Parkison | 137/625.17 |
| 3,433,453 | 3/1969 | Flint | 251/174 X |
| 3,543,799 | 12/1970 | Hayman | 137/625.17 X |
| 3,667,503 | 6/1972 | Farrell et al. | 137/625.4 |
| 3,747,638 | 7/1973 | Manoogian et al. | 137/625.4 |
| 3,794,074 | 2/1974 | Watts | 137/625.4 |

Primary Examiner—Henry T. Klinksiek
Attorney, Agent, or Firm—Wenderoth, Lind & Ponack

[57] ABSTRACT

The tap is actuated by a rod carried by a spherical ball mounted in the tap body by bearing means and has two inlet orifices in an end wall of the tap body. A flat slide capable of closing or opening the inlet orifices is connected to the ball by a transmission comprising a spherical pivot co-operating with a tubular sleeve and means for guiding the movements of the slide in a plane parallel to itself when the ball pivots about an axis perpendicular to the rod. There are provided two lateral recesses in the slide and a rectangular guide integral with the slide and an orientation ring having a longitudinal slot for guiding the movements of the guide and slide in a first direction. There are also provided ramps perpendicular to the slot and co-operating with sliding surfaces on a lower part of the bearing means for the purpose of the simultaneous movement of the slide and ring in a second direction perpendicular to the first direction. One of said directions is parallel to a plane containing the axes of the inlet orifices.

2 Claims, 6 Drawing Figures

MIXER TAP

BACKGROUND OF THE INVENTION

The present invention relates to a mixer tap intended for example to be employed on a washbasin, bath or other apparatus as a hot-cold tap which controls the supply of cold water and hot water. Such a tap must permit the regulation of, on one hand, the flow of the fluid issuing from the tap and, on the other hand, the temperature of this fluid, that is to say the proportions of the two liquids in the mixture.

Various types of mixer taps exist which permit this double regulation. Some thereof even comprise only a single control lever which controls the two parameters. Unfortunately, the operation of this control lever is not always immediately clear to the user and taps of this type usually only permit imperfectly achieving a constant temperature of the mixture in the course of an operation varying the flow and a constant flow in the course of a modification of the temperature. Moreover, the variations in the flow and temperature are rarely effected with a satisfactory progressivity and the arrangements adopted often result in complex and costly manufacture and voluminous devices. Finally, the known taps often result in wear or premature sealing defects and are difficult to service or maintain.

SUMMARY OF THE INVENTION

An object of the present invention is to remedy these drawbacks and to provide a mixer tap which permits regulating in a precise manner the flow of the mixture or the proportions of its components without modifying the second of said parameters and which also permits effecting the two regulations simultaneously.

The invention provides a mixer tap comprising a control rod carried by a spherical ball and two inlet orifices in side-by-side relation in a flat end wall of the body of the tap, a flat substantially circular slide parallel to said end wall, bearing against the two orifices and capable of simultaneously or separately closing or opening the orifices, a spherical pivot and a tubular sleeve which are co-operative with each other and of which one is integral with the slide and the other with the ball, and a system for guiding the slide which maintains it parallel to itself while allowing movements of translation in all directions of its plane, the rotation of the rod about an axis which intersects the centre of the ball and is perpendicular to the axis of the rod being converted into a translation of the slide in its plane and the direction of the last-mentioned translation varying with variation in the direction of said axis.

According to the invention, the tap comprises a rectangular guide fixed to the slide and an orientation ring provided with a guide slot for guiding the displacement of said guide and of the slide in a given direction and provided with ramps which are perpendicular to the direction of the slot and co-operate with sliding surfaces of the lower part of a fixed bearing supporting the ball for the purpose of the simultaneous displacement of the slide and of the ring in a second direction perpendicular to the first direction, one of the directions of the ramps and slot being parallel to the plane containing the axis of the orifices and the other being perpendicular to said plane.

When the slide is driven by the ball in a direction parallel to the slot of the orientation ring, the latter remains stationary and the rectangular guide moves in the slot whereas the slide slides in contact with the lower surface of the ring. On the other hand, when the slide is shifted in a direction perpendicular to the slot, the ring is moved therewith and slides on the lower surface of the bearing of the ball. In a preferred embodiment, the slot is perpendicular to the plane containing the axes of the orifices so that the displacement of the slide alone in a direction parallel to said slot modifies in a similar manner the uncovered areas of each of the two orifices and consequently produces a variation in the flow of the mixture supplied to the pouring spout. The common displacement of the slide and the ring causes a variation in opposite directions of the uncovered areas while maintaining the total of their areas constant. The proportions of the liquid in the mixture therefore vary and this modifies the temperature of this mixture but the flow remains constant. It will be understood that the two movements are easily combined owing to the spherical shape of the ball and pivot, so that the two parameters may be regulated simultaneously.

The flat side and the seats of the orifices, the surface of which is planar, can be easily constructed from a very hard polished material which considerably reduces the tendency to wear. Further, as the orifices are closed by the outer peripheral edge of the slide and not by orifices or recesses formed within this peripheral edge, the overall dimensions of the disc, and consequently the dimensions of the chamber within which the disc is located, are reduced.

BRIEF DESCRIPTION OF THE DRAWINGS

Further features and advantages of the invention will be apparent from the ensuing description with reference to the accompanying drawings.

In the drawings.

DETAILED DESCRIPTION OF THE INVENTION

Figure 1:
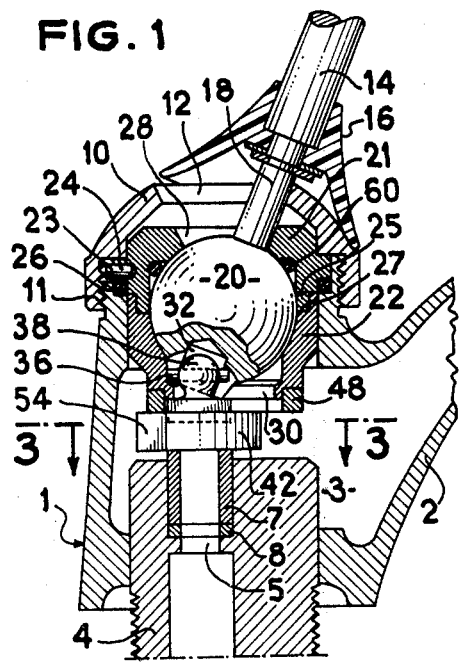
FIG. 1 is an axial sectional view of a mixer tap.
Figure 2:
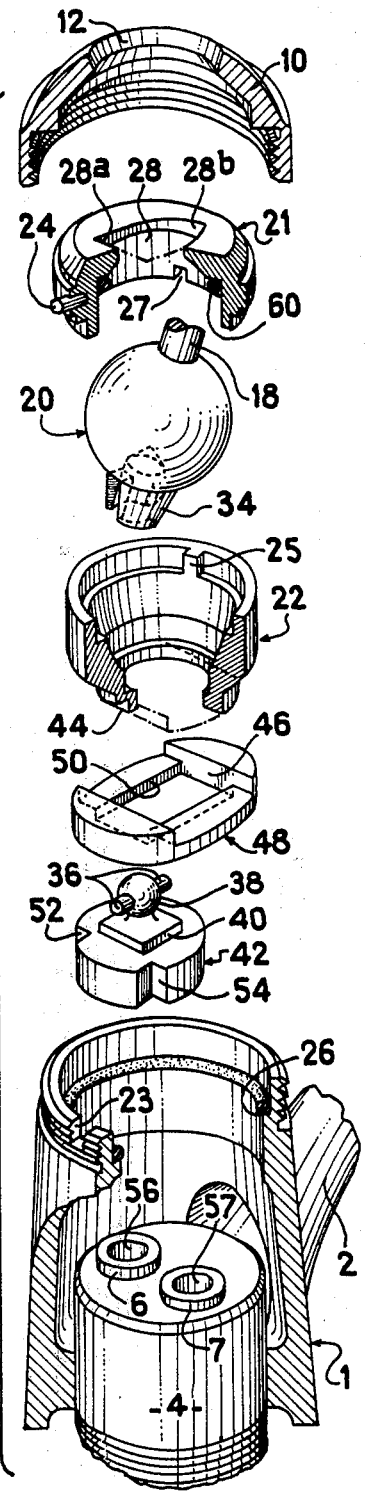
FIG. 2 is an exploded view of the tap.

The mixer tap shown in FIGS. 1–4 comprises in the conventional manner a substantially cylindrical hollow body 1 which is provided with an outlet or spout 2 which communicates laterally with the internal chamber 3 of the body. The latter is fixed in its lower part to an end connection 4 provided with two apertures 5 which are parallel to each other and to the axis of the chamber 3 in each of which apertures is mounted a liquid supply pipe (not shown). Each aperture 5 is extended through the connection 4 to the chamber 3 and includes in the region of the latter an enlarged part which defines with the rest of the aperture shoulder means. In the enlarged part there is freely slidable a tubular seat 6, 7 which bears against said shoulder means through a resiliently yieldable assembly 8, comprising a ring and a compressed spring the force of which spring is added to the effect of the pressure of the fluid to apply the ring against the lower end surface of the seats 6 and 7 and against the wall of the aperture 5 and thus prevent any passage of liquid between the seats and the apertures.

The rings are preferably of rubber and are self-sealing. The seats 6 and 7 thus define at their upper ends two fluid inlet orifices or ports 56 and 57 located in a common plane.

In its upper part, the body 1 is closed by a cap 10 constituted by a portion of a sphere and screwed at 11 to the body 1. This cap 10 is provided with an opening 12 through which extends a control or actuating lever 14. The latter supports a protective cover 16 which substantially fits the shape of the upper surface of the cap 10 and slides thereon when the lever 14 is moved. This lever is connected by a rod 18 to a spherical ball 20 which is mounted inside the body 1 in a bearing constituted by two bushes or bushings 21 and 22 which are upper and lower bushes respectively. The upper bush 21 is prevented from rotating with respect to the body 1 and the cap 10 by a lug or pin 24 which is engaged in a recess 23 in the body 1. A sealing element 26 is interposed between these parts. The bushes 21 and 22 are connected together by a tooth 25 formed in the upper part of the lower bush 22 and fitted in a corresponding recess 27 in the lower part of the upper bush 21.

The upper and lower bushes are provided with an aperture 28 and 30 respectively. The rod 18 of the ball 20 extends through the aperture 28 and an O-ring 60, trapped between the ball and the bush, affords the seal. The ball 20 is provided at a point diametrally opposed to the rod 18 with a recess 32 and carries around this recess a sleeve 34 provided with two longitudinal slots. Two pins 36, perpendicular to the axes of the chamber 3 and the tubular seats 6 and 7 and fixed on each side of a spherical pivot 38 which is located in the recess 32 and is tangent on its periphery to the walls of this recess, extend into said slots. The pivot 38 extends through the opening 30 and is integral with a rectangular guide 40 fixed in a flat slide 42 which is located below the bush 22 and has a generally substantially circular shape and bears on the two tubular seats 6 and 7.

The lower part of the lower bush 22 has two sliding surfaces 44 which are parallel to each other and to the plane containing the axes of the two tubular seats 6 and 7. These two surfaces 44 co-operate with two guide surfaces 46 carried by an orientation ring 48 which is mounted around the guide 40 between the slide 42 and the lower bush 22. This orientation ring has a circular outer surface and is provided with an internal rectangular slot 50 whose lateral walls are in contact with the two opposed sides of the guide 40 but within which lateral walls the guide 40 is slidable. The slot 50 is perpendicular to the guide surfaces 46. It will be understood that the assembled members 10, 21, 22 and 48 constitute support means for the slide 42, which means provide an abutment for the side of the slide opposed to the side engaging the seats 6 and 7 and allow the slide to move in any direction parallel to the side of the slide engaging the seats 6 and 7.

The upper surface of the tubular seats 6 and 7 is exactly planar so that the slide is easily slidable thereon. The force exerted by the compressed spring of the resiliently yieldable system 8 and the pressure of the liquids bias the seats 6 and 7 against the lower surface of the slide 42 which constitutes a valving surface so that the contacts between the seats and the slide are fluidtight and wear and the manufacturing tolerances are taken up. The outer contour or outer peripheral edge surface of the slide 42 is provided with two lateral V-shaped notches or recesses 52 and 54 the sides of which recesses constitute valving edges of the slide and are respectively parallel to the two main directions of sliding of the slide and whose dimensions are such that they can both simultaneously arrive above the orifices 56, 57 defined by the tubular seats 6 and 7 respectively.

The tubular seats 6 and 7 and the orifices 56 and 57 are preferably identical. Likewise, the recesses 52 and 54 have the same dimensions and the tap is symmetrical with respect to a plane passing between the two seats and between the two recesses.

Figure 3:
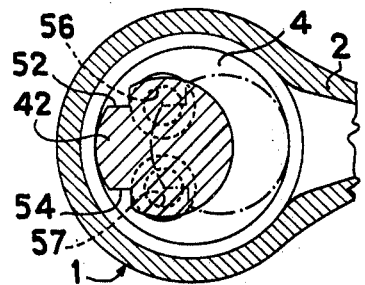
FIG. 3 is a sectional view taken on line 3—3 of FIG. 1 illustrating the regulation of the rate of flow.
Figure 4:
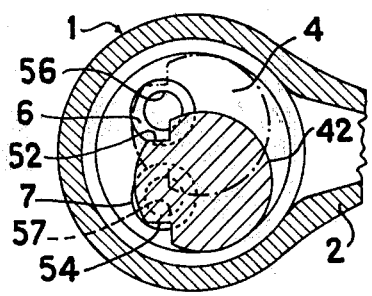
FIG. 4 is a sectional view similar to FIG. 3 illustrating the regulation of the proportions of the fluid in the mixture.

As shown in full line in FIG. 3, the slide 42 has an extreme position in which the recesses 52 and 54 are located beyond the tubular seats 6 and 7 and the orifices 56 and 57 are closed by the solid part of this slide 42. When the lever 14 is displaced from the position shown in FIG. 1, corresponding to the position of the slide indicated in full line in FIG. 3, to a position located to the left of FIG. 1, the ball 20 pivots inside the bushes 21 and 22 and around the sphere 38. The contact between the wall of the recess 32 and the sphere causes the latter to move in such manner that the guide 40 travels along the slot 50 of the ring 48 and shifts the slide 42 to the position shown in dot-dash line in FIG. 3. In this position, the two recesses 52 and 54 are above the two orifices 56 and 57 respectively and the latter are opened or unmasked to the same extent. The flow of the mixture of the two liquids is maximum. The two fluids are supplied in equal amounts by way of the spout 2. It will be understood that the lever 14 may be stopped in any intermediate position between the two positions shown in FIG. 3 depending on the desired rate of flow. Equality of the amounts of the two liquids in the mixture is maintained irrespective of the position of the slide 42.

Likewise, the lever 14 may be shifted in a plane perpendicular to that of FIG. 1 from each of the positions of flow regulation so as to cause the guide surfaces 46 to slide along the surfaces 44, the guide 40 driven by the pivot 38 bearing against the wall of the slot 50. The slide 42 moves in translation in a direction perpendicular to the plane of symmetry of the tap, for example toward one of the two positions indicated respectively in dot-dash line and full line in FIG. 4. In one of these extreme positions, namely that indicated in full line, the slide has slid downwardly as viewed in the FIG. 4 and closes the orifice 57 and completely opens or unmasks the orifice 56. In the other position, it has slid upwardly as viewed in FIG. 4 and opens the orifice 57 and completely closes the orifice 56. This movement in translation parallel to the plane containing the axes of the seats 6 and 7 results in a variation in the proportions of the two liquids in the mixture and, in the case of a hot-cold liquid mixing tap, a variation in the temperature of this mixture. However, during this variation the rate of flow remains unchanged. Owing to the shape of the recesses 52 and 54, the area which is opened or unmasked in one of the orifices is exactly equal to that which is masked in the other orifice. Thus, there is obtained a modification in the proportions of the mixture without a modification in the rate of flow.

It will be understood that the displacement of the lever 14 could be a combination of the two displacements described hereinbefore so as to modify not only the flow but also the proportions of the components of the mixture, since the transmission of the movement occurs through two spherical members, namely the ball and the pivot, and the slide 42 may both move in the slot 50 and urge the latter in a direction parallel to the guide surfaces 46.

Indications carried by the cover 16 outside the tap permit easily ascertaining the different movements to be effected.

In order to facilitate the shifting of the lever 14, the opening 28 of the upper bush 21 for the ball 20 has moreover an appropriate shape and acts as a guide means for the valve actuating means comprising members 18, 20 and 42 to limit the movements of the slide 42 within a predetermined area. It comprises for example a rectilinear portion 28$^a$ (FIG. 2) which is relatively wide at the end which corresponds to the position of maximum flow so as to permit a variation in the proportions of the liquids between the two extreme values, that is to say, from the closure of the supply of the first liquid to the closure of the supply of the second liquid. On the other hand, at its opposite end, the opening 28 is narrowed so as to terminate substantially at a point 28$^b$, corresponding to the simultaneous closure of the two orifices 56 and 57, toward which point the lever is of course guided in the course of the closing operation. From this position it is sufficient to laterally displace the lever in following the contour of the edge defining the opening 28, toward the right to obtain a progressively increasing flow of cold water and to the left to obtain a progressively increasing flow of hot water.

Figure 5:
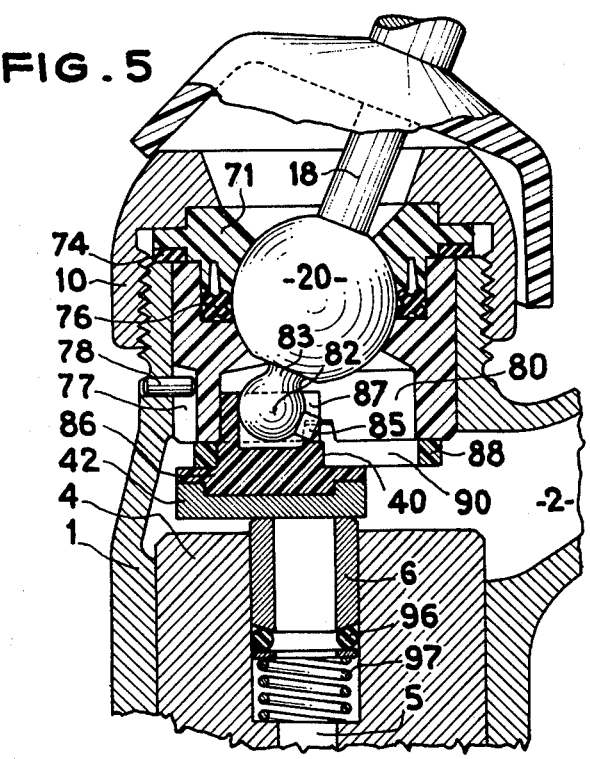
FIG. 5 is an axial sectional view similar to FIG. 1 of a modification of the tap.

FIG. 5 shows a modification of the tap which operates in the same manner but in which the ball 20 is maintained between an upper bush or bushing 71 and a lower bush or bushing 72 between which bushes a sealing element 74 is compressed by the tightening or clamping of the cap 10 so as to ensure the external sealing. Another O-ring 76 is trapped between a shoulder of the lower bush 72 and an extension of the upper bush 71 and is in contact with the ball on a large circle of the latter. Consequently, it ensures the sealing of the ball 20. The lower bush 72 has a vertical outer recess 77 and is prevented from rotating with respect to the body 1 by a pin 78 which is integral with the body 1 and extends into this recess.

Figure 6:
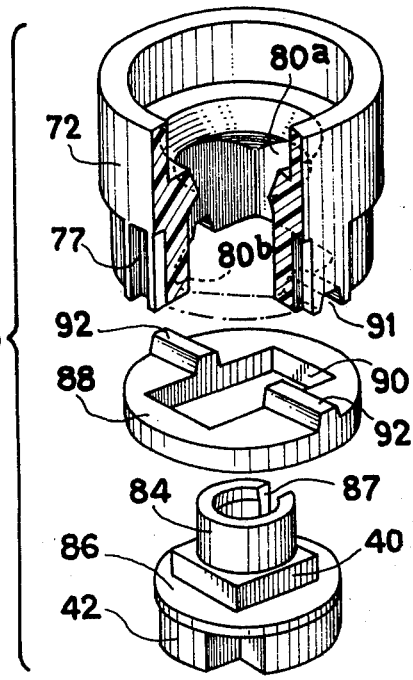
FIG. 6 is an exploded view of the system for guiding the slide in this modification.

The lower bush 72 defines below the seat of the ball a chamber 80 which has a shape preferably similar to that of the opening 28 of the bush 21. It has a rectilinear portion 80$^a$ which is relatively wide at the end which corresponds to the position of maximum flow, whereas its opposite end 80$^b$ is narrowed and terminates substantially in a circular shape (FIG. 6).

Located in the chamber 80 is a spherical pivot 82 forming the end of a stem 83 which extends from the ball 20 at a point diametrically opposed to the actuating rod 18. The sphere 82 is disposed in an inner recess in a tubular sleeve 84 integral with a disc 86 fixed to the upper part of the flat slide 42.

This sphere carries a pin 85 which extends radially in a direction perpendicular to the rod 18 and stem 83 and is engaged in a longitudinal slot 87 formed in the tubular sleeve 84. The latter is displaced in the chamber 80 when the ball 20 is pivoted so that its travel is limited by the particular shape of this chamber. The narrow portion 80$^b$ has a diameter which is preferably substantially equal to that of the sleeve 84 so that the latter may be held stationary at the end of the chamber corresponding to the closure of the tap.

The rectangular guide 40 is formed at the base of the sleeve 84 and co-operates with the longitudinal slot 90 in a ring 88 which is interposed between the disc 86 and the lower surface of the bush 72. This disc 88 has on each side of the slot and in its centre portion a rib 92 which is perpendicular to said slot and has a rectangular section, the opposite faces of which rib perform the function of guide surfaces and slide along the opposed faces of a recess 91 of corresponding shape formed in the lower surface of the bush.

The slide 42 is, as in the foregoing embodiment, in sliding contact with the seats 6 and 7 surrounding the fluid inlet orifices which are mounted in the apertures 5 and bear, through a ring 96 and a spring 97, against an inner shoulder of the apertures 5. Preferably, the slot 90 of the orientation ring 88 is perpendicular to the plane containing the axes of the orifices so that the pivoting of the ball about a horizontal axis parallel to this plane shifts the sleeve 84 and the guide 40 along the slot without shifting the ring and this opens or closes the two orifices in a similar manner. The ribs 92 are parallel to a line through the centres of the orifices. They have exactly the same function as the guide surfaces 46 and guide the simultaneous displacement of the ring and slide for modifying the proportions of the mixture.

Whatever the embodiment employed, the extremely simple planar shape of the slide enables it to be manufactured with real precision and in particular of a material of high hardness, for example a sintered ceramic material or stainless steel, which has a good resistance to corrosion and other harmful effects of the liquids and thus ensures an extremely durable seal with no adverse wear. The tubular seats are advantageously made from the same material. Preferably, the disc supporting the rectangular guide, the orientation ring and the lower and upper bushes are of plastics materials selected for their good performance in the presence of water, their hardness and their low coefficient of friction. The rods 18 and 19 and the ball 20 are of brass or stainless steel.

The tap can thus be used with no danger of leakage for a long time. It moveover ensures simultaneous or successive, precise and effective regulations of the flow and temperature.

It will be understood that such a mixer tap may be employed for all kinds of mixtures, its application being in no way limited to the supply of water or to sanitary equipment. It may be adapted to other liquids by, for example, the choice of the relative dimensions of the two inlet orifices and the two recesses, the ratio between the dimensions of the two orifices remaining always the same as that of the two recesses so as to always ensure that one of the parameters remains constant during the variation of the other parameter.

Having now described my invention what I claim as new and desire to secure by Letters Patent is:

1. In a mixer tap comprising means defining a body having a chamber and an end wall which defines a part of the chamber; means defining an outlet for the chamber; means defining two inlet apertures in side-by-side spaced relation opening onto the end wall; valve actuating means comprising a rigid hard slide defining a flat valving surface, a spherical ball mounted relative to the body to pivot about the centre of the ball, a rod carried by the ball, and means connecting the ball to the slide whereby the rod is capable of shifting the slide in directions parallel to the valving surface; means for supporting the slide in the chamber and allowing the slide to move in directions parallel to the valving surface while maintaining a given orientation of the slide relative to the inlet apertures: the improvement comprising in combination two rigid hard tubular seats respectively mounted to be slidable axially of the seats in the two inlet apertures and having rigid hard flat first ends defining inlet ports slidably and sealingly engaging the valving surface and opposite second ends, the inlet apertures defining inner shoulder means spaced from the second ends of the seats axially of the seats, a resiliently yieldable self-sealing assembly interposed between and in a compressed state between the second end of each seat and the corresponding shoulder means and radially sealingly engaging the corresponding inlet aperture whereby the seat is sealingly combined with the inlet aperture and has its first end biased gainst the valving surface, the support means providing a rigid abutment for the slide in a direction perpendicular to the valving surface, the slide having an outer contour which has two contour portions defining two lateral notches which extend the entire thickness of the slide and constitute valving edges of said flat valving surface which are respectively cooperable with the two ports to be capable of selectively closing for zero flow and uncovering for maximum flow the two ports selectively simultaneously and separately according to the orientation of the rod about the centre of the ball, the parts of the ports and seats uncovered by the slide valving edges of the notches being outside said outer contour of the slide.

2. A tap as claimed in claim 1, wherein the axes of the two inlet ports are contained in a plane perpendicular to the valving surface and each of the two notches is defined by two surfaces arranged at right angles to each other in the form of an L, one notch surface being parallel to said plane and the other notch surface being perpendicular to said plane.

* * * * *